Jan. 27, 1970     O. W. LOGAN     3,492,041
ROOF RAISING MECHANISM FOR CAMPING TRAILERS
Filed Dec. 8, 1967                 2 Sheets-Sheet 2

INVENTOR
ORVILLE W. LOGAN

By
Cushman, Darby & Cushman
ATTORNEYS

United States Patent Office 3,492,041
Patented Jan. 27, 1970

3,492,041
ROOF RAISING MECHANISM FOR
CAMPING TRAILERS
Orville W. Logan, 7 Graham Crescent,
London, Ontario, Canada
Filed Dec. 8, 1967, Ser. No. 689,065
Claims priority, application Canada, Jan. 27, 1967,
981,394
Int. Cl. B60p 3/34
U.S. Cl. 296—23                                6 Claims

ABSTRACT OF THE DISCLOSURE

A box trailer for camping purposes has a roof portion connected to the box by a flexible material which constitutes the walls of the trailer when the roof is raised. A mechanism for raising and lowering the roof uses only two masts, one at each end of the box. By raising the roof to a point where the walls are taut, the roof is thus stabilized.

---

This invention relates to collapsible camping trailers of the type that generally includes a trailer box mounted on a chassis on wheels, a raisable trailer roof for covering the trailer box, collapsible walls of a flexible material interconnecting the trailer roof and box, and a roof raising mechanism.

More specifically, the present invention relates to an improved roof raising mechanism which is relatively simple to manufacture and operate. Roof raising mechanisms of the prior art use on the average of four vertical masts or posts to support the roof member. These masts must often be mounted in place on the trailer box before the roof raising mechanism can be used. Furthermore, any pulleys, spools or ropes employed in co-operation with the masts must also often be pre-positioned to be made ready for use. When the trailer is not being used and the trailer roof is lowered, such spools and ropes would then have to be stored in the trailer box or another suitable location. A camping trailer of this kind is described in Canadian Patent 604,137 issued to A. D. Plett on Aug. 20, 1960.

The present invention utilizes a pair of collapsible masts mounted on the trailer box for supporting the roof member, and avoids disadvantages inherent in prior art constructions.

In the roof raising mechanism of the present invention, the masts, spools and ropes need not be dismantled and stored when the trailer roof has been lowered, and the trailer is to be moved.

The improved roof raising mechanism of the present invention broadly comprises (a) a single pair of masts, each of said masts adapted to have its axis substantially perpendicular to the box and roof members and co-planar to said axes and the centre of gravity of said roof member, (b) pivot means for pivotally effecting positioning of each of said masts to a non-operative collapsed position and to an operative upright position, and (c) lifting means interconnecting said box and roof members being operable with said masts in said upright position for lifting and lowering said roof member to and from a raised position whereat the wall means are taut for effecting stabilization of said roof member.

Specific details of the preferred embodiment of the present invention will now be described by way of example and with reference to the accompanying drawings wherein.

Figure 1:
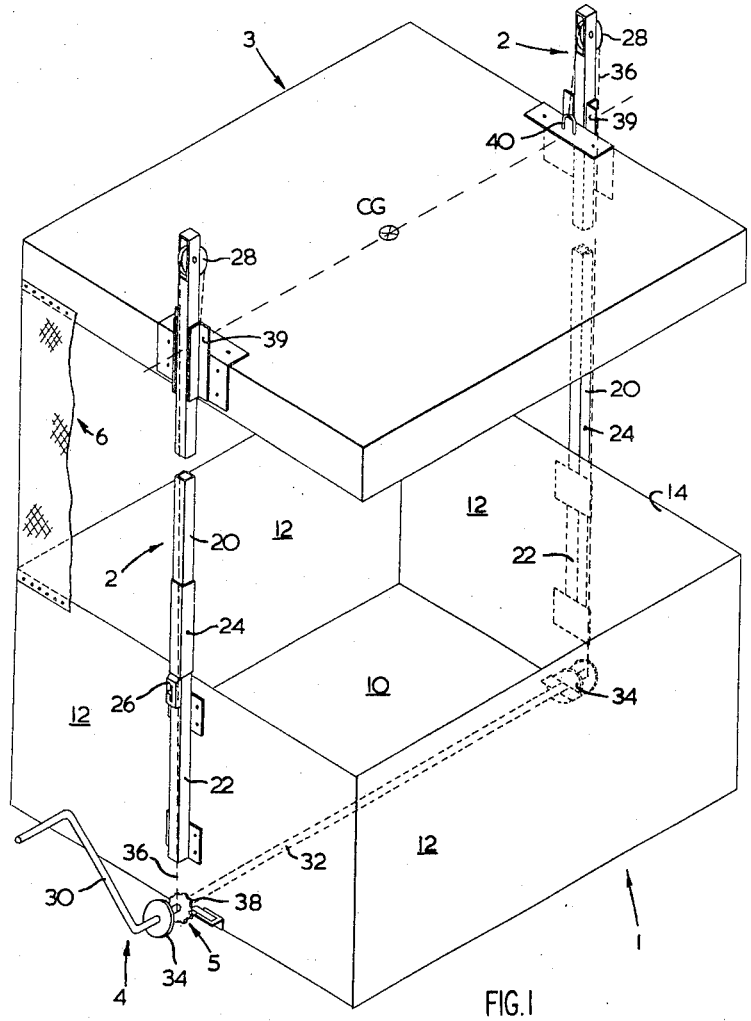
FIGURE 1 is a schematic view in perspective of the camping trailer of the present invention with the roof in its raised position.

With reference to the drawings, a trailer box 1 is mounted on a chassis having wheels (not shown), adapted to be pulled along behind a motor vehicle. The trailer box consists of a floor 10, four side walls 12 and has an open top 14. Two collapsible masts 2 are rigidly mounted opposite one another on the trailer box, and are operable to co-operate with a cranking mechanism 4 to facilitate raising and lowering of a trailer roof 3, and to support the latter when it is raised. Each mast comprises a collasible upper section 20 and a lower section 22 fixedly secured to either the floor or end or side walls of the trailer box. A pivot pin 24 forms a pivotal connection whereby the upper section 20 of each mast 2 is pivotable to a non-operative collapsed position and to an operative upright position. In the collapsed position the upper section 20 of each mast 2 overlies the trailer roof 3, or alternatively is collapsed adjacent a side wall 12 of the trailer box 1.

A spring loaded latch 26 is mounted on the fixed lower section 22 of each mast, and coacts with the lower portion of the collapsible section 20 of each mast to lock the same in the upright position. Any alternative locking or holding means may be used instead of the latch shown. For example, a snug frictional engagement between the sections of each mast may be used. The collapsible section 20 of each mast 2 carries a guide spool 28 mounted for rotation near the top thereof, to be co-operative with a roof raising crank mechanism 4 to be described below.

A conventional type of crank mechanism is mounted on the trailer box 1, to raise and lower the trailer roof 3. Such a crank mechanism 4 consists of a crank handle 30 at one end of a shaft 32, the latter being rotatably mounted on the bottom side of the floor 10 of the trailer box 1, as shown in FIGURE 1. A wind-up spool 34 is rigidly mounted at each end of the shaft 32, and carries cable 36 or rope which extends from the wind-up spools, over the guide spools 28 and is secured to the trailer roof 3. A ratchet wheel 38 of a ratchet mechanism 5 is also rigidly secured to the shaft 32 and, for convenience, is located at the end of the shaft near the crank handle 30. The ratchet mechanism 5 operates to prevent unintentional unwinding of the cable 36 from the wind-up spool 34 and the resultant lowering of the roof 3. Instead of the ratchet mechanism shown, any suitable braking device may also be used. Similarly, the manually operated crank mechanism 4 could be replaced by a motor driven winch or the like.

The trailer roof 3 is adapted to cover the open top 14 of the trailer box 1 when the former is in its lowered position, and the trailer is not being used. Preferably, the present trailer roof 3 is of one piece construction and made of fiberglass or metal. Other structural arrangements are, of course, possible. Flexible walls 6 (FIG. 1) are fastened to the roof and box members 1 and 3 of the trailer, and are collapsible into the trailer box when the roof is being lowered. Any suitable button-type fastener, or its equivalent, may be used to fasten the flexible walls to the roof and box members. The flexible walls are usually made of canvas, or a similar material, and are usually provided with zippered or buttoned openings for doorways and windows.

Figure 2:
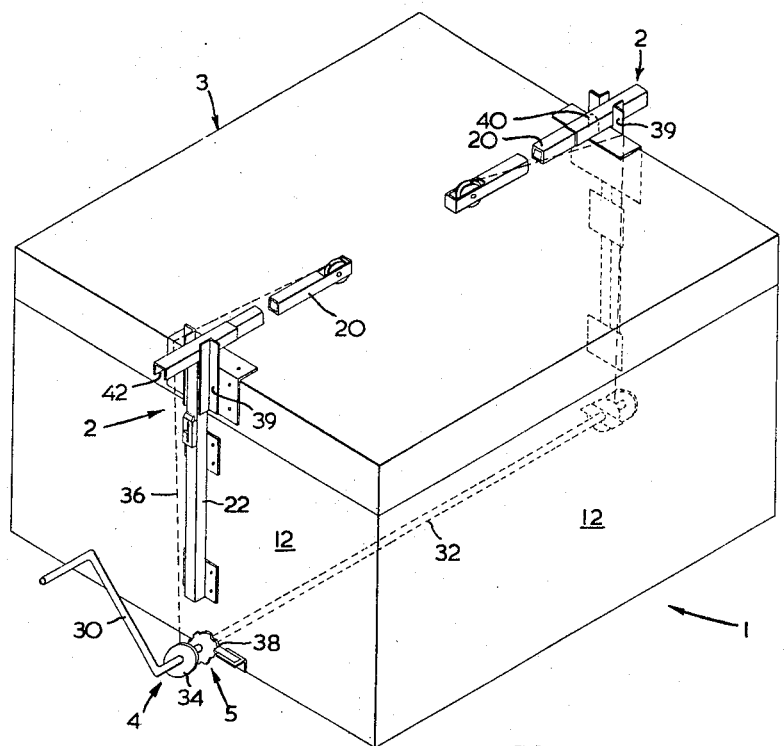
FIGURE 2 is a schematic view in perspective of the present camping trailer with its roof and masts in a down position.

The trailer roof 3 is provided with guide elements 39, rigidly fastened thereto at the edges of said roof, and in alignment with the masts 2. When the pivotal section 20 of each of the masts is moved to the upright position, the masts 2 will stand in guided engagement with said guide elements 39. A securing lug 40 is also rigidly fastened to the trailer roof 3, and is adjacent the guide elements 39. The collapsible section 20 of each mast has an opening 42 (see FIG. 2) therein to permit each mast to be lowered over the securing lug 40 when the mast 2 is moved to its collapsed position overlying the trailer roof. In this way the whole of the collapsible section 20 of each mast 2 lies flat on the trailer roof 3. Alternatively the pivotal connection may be spaced high enough above the level of the trailer roof 3 to enable the collapsible section 20 of each mast 2 to be lowered onto the roof without contacting the securing lug 40, i.e., avoiding any need for the opening 42.

The wind-up cable 36 or rope wound on each of the wind-up spools 34, passes over the guide spools 28 at the top end of each mast 2, and is connected to the securing lug 40. Thus, the crank mechanism 4 is connected to both the trailer roof 3 and trailer box 1, and is operable to raise or lower the roof as desired. It should be noted that the crank mechanism 4 including spools, cables and such, are always carried in situ, ready for use. The masts are carried in situ as well. This permits raising or lowering of the trailer roof 3 to be accomplished quickly and efficiently.

To use the camping trailer of the present invention, the trailer is parked in a location chosen by the user. To raise the trailer roof 3, in preparation for providing a place in which to live or sleep, the collapsed section 20 of each of the masts 2 is pivoted to the upright position. The spring latches 26 lock the movable sections 20 of the masts in place, and the guide elements 39 engage the masts as described earlier. As the crank handle 30 is turned say clockwise, and the shaft 32 is rotated, the cable 36 is wound up onto the wind-up spools 34, and the trailer roof is raised.

When the trailer roof has been raised to its limiting position upwardly, the cables 36 and flexible walls 6 are stretched taut, and maintained in that condition by means of the ratchet mechanism 5. Since the trailer walls are taut, they serve to stabilize the trailer roof, preventing any tendency of the roof to tilt about an axis joining the upper ends of the masts 2. Maximum stabilization of the trailer roof is achieved if the centre of gravity C.G. of the roof is co-planar with the axes of the upright masts 2, since only two masts are used to support the roof.

To lower the trailer roof 3, the ratchet mechanism 5 is unlocked, the user firmly grasps the crank handle 30, turning it counter-clockwise. The trailer roof is then lowered by virtue of its own weight. The user merely provides a restraining force preventing too rapid lowering, i.e. falling down, of the roof. When the roof is fully down, the flexible walls will have collapsed into the trailer box 1. The latches 26 on the masts 2 are unlocked and the movable sections 20 of the masts are swung down to lie on the trailer roof. Any slackness in the cables 36 may be taken up if needed, but otherwise the trailer is ready to be moved to a new location. It is not necessary to dismantle the wind-up cables, guide spools or masts, as noted above.

The present invention in its preferred form has been described and illustrated in connection with a trailer which is generally cubical in shape. Other forms are possible. For instance, instead of a four-sided trailer, a person might use a three-sided trailer, one which is snub nosed, tear-drop shaped or the like. Such a wide variety of shapes may easily be used, since only two roof supporting masts 2 are involved. These two masts are located on "opposite" sides of the trailer, i.e., they are oppositely located, and the points at which the roof is supported, i.e., at the securing lugs 40 and the guide elements 39, are located substantially co-planar with the axes of the masts 2 and the centre of gravity C.G. of the roof. This arrangement minimizes the additional stabilizing force which is required to counteract any tendency of the roof to tilt. As a result, the flexible trailer walls are able to provide what little additional stabilizing force is needed.

Many modifications are possible within the scope of the present invention. For example, the masts may be collapsed using socket or ball joints to a position overlying the trailer roof, or alongside the sides of the trailer box. Various types of ratchet, crank and latch mechanisms or their equivalents may be used, as these items may be left to the choice of the manufacturer. In addition, other arrangements for mounting the lifting mechanism may be used as alternatives. Generally the cranking mechanism will be mounted in operative proximity to the masts, depending on the exact positioning of the latter. Similarly, in the illustrated embodiment, the masts have been symmetrically located. This may not necessarily be the case with trailers of an unconventional, i.e., non-rectangular, shape. However, it is preferable that the axes of the masts and the centre of gravity of the trailer roof be substantially co-planar, for reasons of stability, as noted above.

I claim:

1. A roof raising mechanism for collapsible camping trailers of a type having a box member, a raisable roof member for covering said box member, and collapsible flexible wall means for interconnecting said box and roof members, said roof raising mechanism comprising:
   (a) a single pair of masts, each of said masts adapted to have its axis substantially perpendicular to said box and roof members and coplanar to said axes and the centre of gravity of said roof member;
   (b) pivot means for pivotally effecting positioning of each of said masts to a non-operative collapsed position and to an operative collapsed position and to an operative upright position;
   (c) each of said masts including a movable section pivotally mounted for effecting positioning of said mast to said positions; and
   (d) lifting means interconnecting said box and roof members, co-operating with said masts in said upright position for lifting and lowering said roof members respectively to and from a raised position whereat said wall means are taut for effecting stabilization of said roof member.

2. The apparatus according to claim 1 wherein said movable section overlies said roof member when said mast is in the collapsed position.

3. The apparatus according to claim 1 wherein said pivot means includes latching means for releasably holding at least one of said masts in said operative upright position.

4. A collapsible camping trailer having a box member mounted on a chassis on wheels, a raisable roof member for covering said box member, collapsible flexible wall means for interconnecting said box member and said roof member, and a roof raising mechanism for lifting and lowering said roof member, said roof raising mechanism comprising:
   (a) A single pair of masts, each of said masts adapted to have its axis substantially perpendicular to said box and roof members and co-planar to said axes and the centre of gravity of said roof member;
   (b) pivot means for pivotally effecting positioning of each of said masts to a non-operative collapsed position and to an operative upright position;
   (c) each of said masts including a movable section pivotally mounted for effecting positioning of said masts to said positions; and
   (d) lifting means comprising a cord and pulley arrangement interconnecting said box and roof members, being operable with said masts in said upright position for lifting and lowering said roof member respectively to and from a raised position whereat said wall means are taut for effecting stabilization of said roof member.

5. The apparatus according to claim 4 wherein said movable section overlies said roof member when said mast is in the collapsed position.

6. The apparatus according to claim 4 wherein said pivot means includes latching means for releasable holding at least one of said masts in said operative upright position.

References Cited

UNITED STATES PATENTS

| | | | |
|---|---|---|---|
| 3,314,715 | 4/1967 | Bontrager | 296—23 |
| 3,339,321 | 9/1967 | Schmidt | 296—27 |
| 2,098,469 | 11/1937 | Smith | 52—66 |

PHILIP GOODMAN, Primary Examiner

U.S. Cl. X.R.

52—66